United States Patent [19]
Clevenger, Jr.

[11] Patent Number: 5,191,833
[45] Date of Patent: Mar. 9, 1993

[54] ROLL STRIPPING APPARATUS FOR ROUND BALER

[75] Inventor: James T. Clevenger, Jr., Lancaster, Pa.

[73] Assignee: Ford New Holland, Inc., New Holland, Pa.

[21] Appl. No.: 868,935

[22] Filed: Apr. 16, 1992

[51] Int. Cl.$^5$ .................. B30B 5/06; A01D 39/00
[52] U.S. Cl. .................. 100/88; 29/121.4; 56/341; 198/498
[58] Field of Search .......... 198/498; 100/5, 87, 100/88, 89; 56/341; 29/121.4

[56] References Cited
U.S. PATENT DOCUMENTS

| | | | |
|---|---|---|---|
| 2,886,169 | 5/1959 | Calder | 198/498 |
| 3,089,415 | 5/1963 | Grembecki et al. | 29/121.4 X |
| 3,613,575 | 10/1971 | Kantor | 29/121.4 X |
| 4,155,298 | 5/1979 | Gaeddert et al. | 100/87 |
| 4,180,155 | 12/1979 | Stevick | 198/498 |
| 4,436,027 | 3/1984 | Freimuth et al. | 100/88 |
| 4,581,879 | 4/1986 | Anstey | 100/88 X |
| 4,648,239 | 2/1987 | Geiser et al. | 100/88 X |
| 4,870,812 | 10/1989 | Jennings et al. | 100/88 X |
| 5,096,407 | 3/1992 | Nebeling | 29/121.4 X |

Primary Examiner—Stephen F. Gerrity

[57] ABSTRACT

Roll stripping apparatus for a round baler that has a frame and a crop conveying mechanism, including rotatable transverse rolls, mounted on the frame. The conveying mechanism provides a series of inwardly facing moving surfaces that define a baling chamber for forming cylindrical bales of crop material fed into the chamber via a pick-up. A scraper assembly, mounted adjacent one of the rolls for preventing buildup of unwanted material on the roll, includes unique structure for engaging unwanted debris randomly deposited on the roll and urging it in a generally axial direction under conditions where the roll is being rotated.

10 Claims, 4 Drawing Sheets

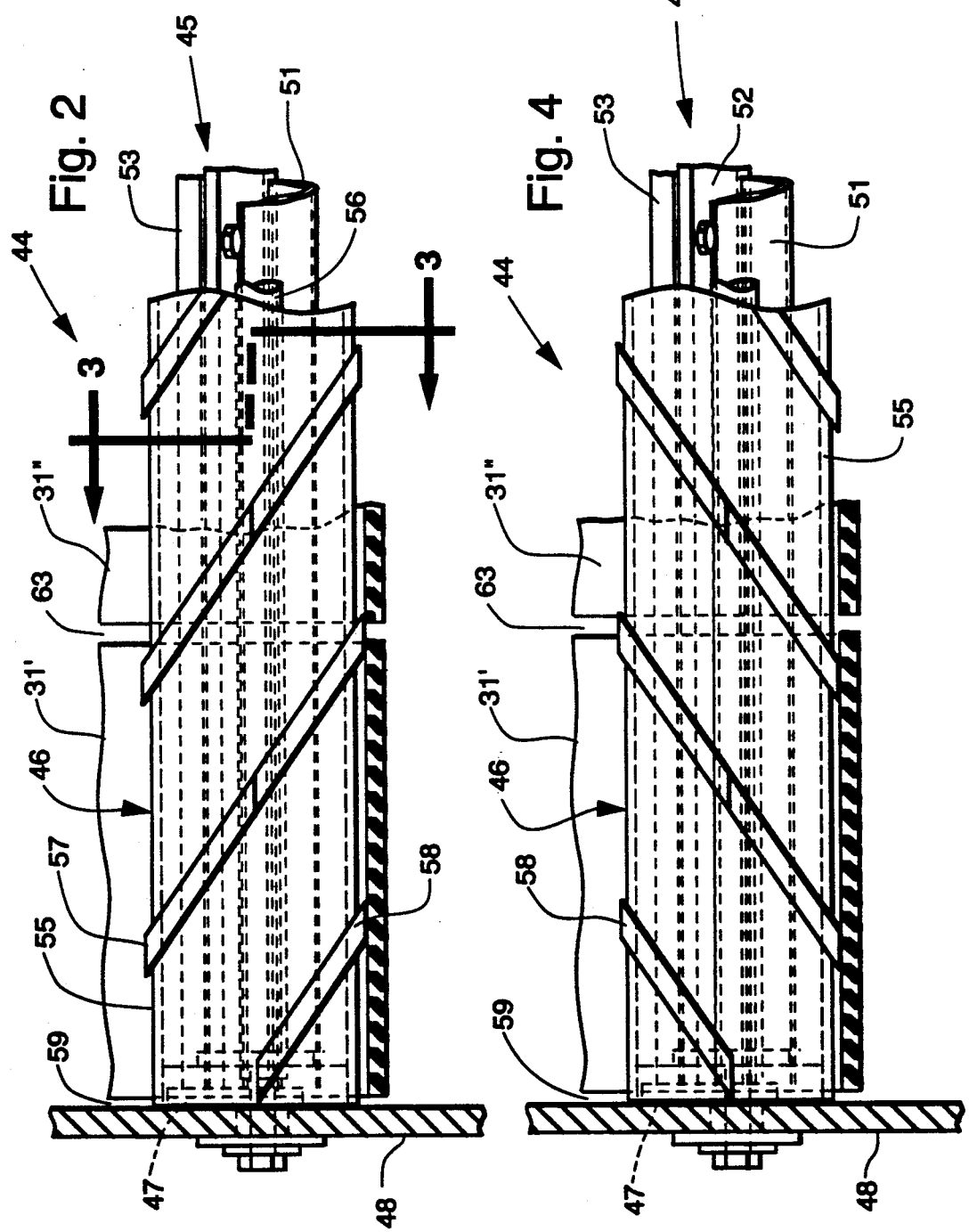

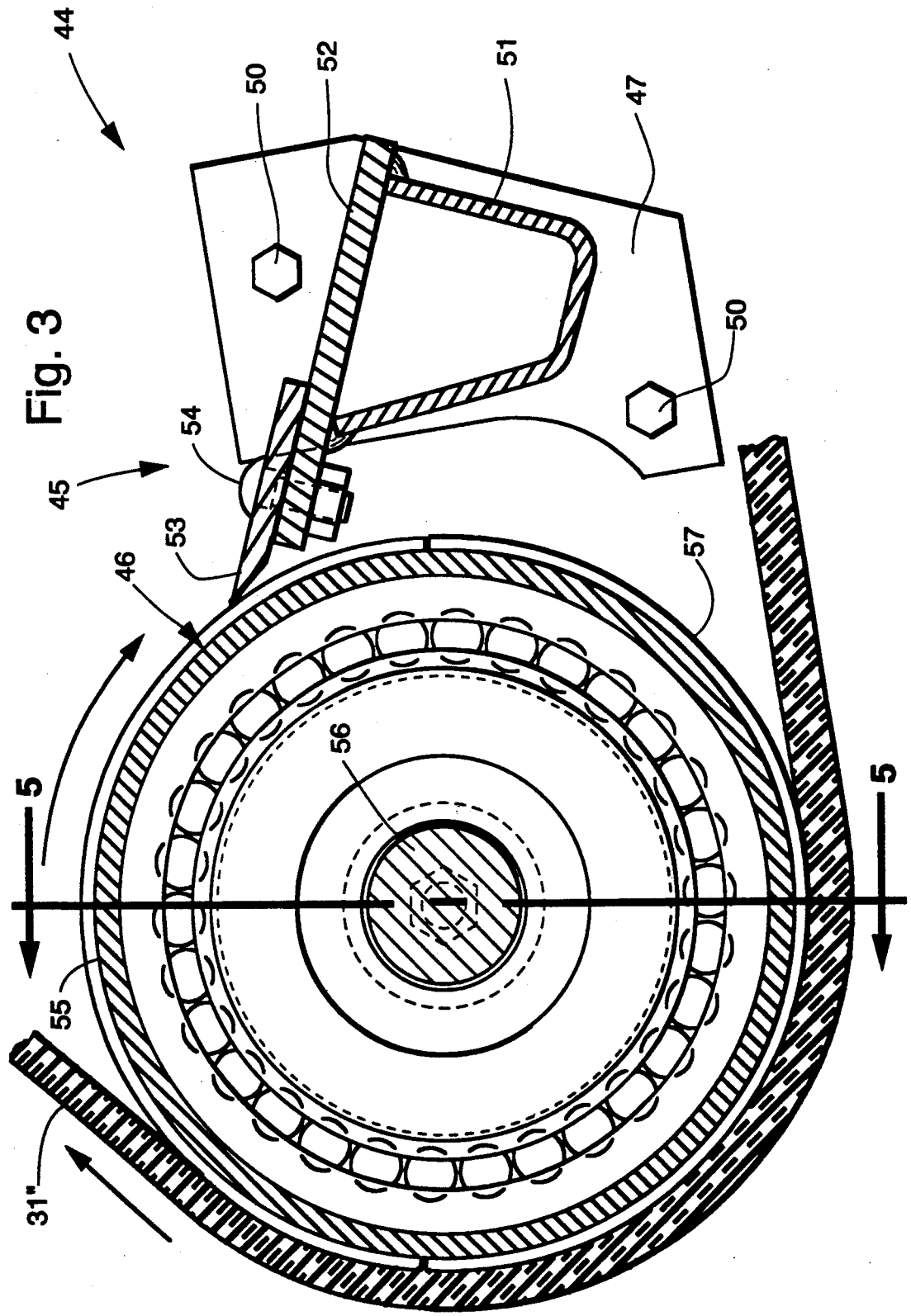

ROLL STRIPPING APPARATUS FOR ROUND BALER

BACKGROUND OF THE INVENTION

This invention relates generally to a baler for forming cylindrical bales of crop material, commonly referred to as a round baler. More particularly, this invention is directed to improved roll stripping apparatus for round balers using rolls in the formation of bales.

Prior art balers of this type generally have a bale forming chamber defined by an apron comprising an array of side-by-side belts, transverse slats trained on chains, a plurality of rolls or a combination of these various elements, e.g., rolls and belts. Crop material, such as hay, is picked up from the ground as the baler traverses the field, fed into a fixed or adjustable chamber where it is rolled up to form a compact cylindrical bale. The formed bale is wrapped in its compacted form while still inside the bale forming chamber by net, twine or the like, prior to ejecting the bale from the chamber onto the ground for subsequent handling.

Round balers of the general type mentioned above comprising a chamber defined at least partially by a plurality of side by side, longitudinally extending belts supported on a plurality of transverse rollers have encountered problems of varying degree caused by build-up of stray crop material on the rolls. Random debris from crop material that is being formed in the chamber passes through the spaces between the belts and becomes entrapped in the area adjacent the guide rolls or drive rolls around which the belts are traversing during operation of the baler. When the crop material being baled is damp and particularly if it is a short cut of grass crop an unwanted build-up of debris tends to form on the roll which is detrimental to proper belt tracking on the rollers. Eventually, if permitted to go uncorrected, serious problems may occur from poor tracking eventually leading to binding of the belts and even eventual belt deterioration and breakage.

A number of prior art solutions to reduce or overcome these problems have been proposed. For example, U.S. Pat. No. 4,581,879, issued in the name of H. D. Anstey on Apr. 15, 1986 discloses an anti-wrap attachment for round balers directed to the avoidance of stray hay wrapping around the ends of a roll in the area of the bearings. Anstey shows a spiral welded or a roll in combination with a scraper mounted with its edge in the vicinity of the roller to remove crop debris being carried around the surface of the roll. Scraping devices in combination with round baler rollers are also shown in various other prior art balers, e.g., U.S. Pat. No. 4,436,027, issued in the name of John H. Freimuth et al on Mar. 13, 1984, shows a stripper bar for preventing crop debris build-up on a floor roller in a round baler. U.S. Pat. No. 4,155,298 issued in the name of M. V. Gaeddert on May 22, 1979, is another example of a prior art baler in which a roll scraper is employed to discourage the build-up of unwanted crop material around the surface of a roll used during the formation of hay into a cylindrical bale.

Although the prior art arrangements of removing debris build-up on rollers has met with varying degrees of success, the root of the problem is the fact that material is permitted to reach the stage at which a scraping device becomes necessary. Thus, prevention of build-up as well as a cooperating scraper are important interrelated aspects of reliable round baler performance to which the present invention is devoted.

SUMMARY OF THE INVENTION

An important object of the present invention is to provide improved roll stripping apparatus for a round baler to enhance the reliability and thereby improve the overall performance by reducing or eliminating the build-up of crop material on rollers that are exposed to random unwanted debris.

In pursuance of this and other important objects the present invention provides for new and unique round baler apparatus having a frame, conveying means including rotatable transverse rolls mounted on the frame, said conveying means providing a series of inwardly facing moving surfaces that define a baling chamber for forming cylindrical bales of crop material, means for feeding crop material into the chamber and a scraper mounted adjacent one of the rolls for preventing buildup of unwanted crop material debris on such roll. The roll is provided with improved structure for engaging the unwanted debris and urging it in a generally axial direction. According to the broadest aspects of the invention, apparatus of the type above is provided wherein the improved structure for engaging unwanted debris includes rigid strips affixed to and extending from the outer surface of the one roll along a path in the shape of a loop. The strips include a leading edge portion for engaging crop material randomly deposited on the roll and urge it in a generally axial direction under conditions where the roll is being rotated. The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 2 is a view taken in the direction of arrows 2—2 in FIG. 1 and shows the improved structure of the present invention.

FIG. 3 is a view taken in the direction of arrows 3—3 in FIG. 2.

FIG. 4 is a view similar to that of FIG. 2 and show the roller in the position it takes when rotated 180 degrees relative to the position shown in FIG. 2.

DESCRIPTION OF THE PREFERRED EMBODIMENT

Figure 1:
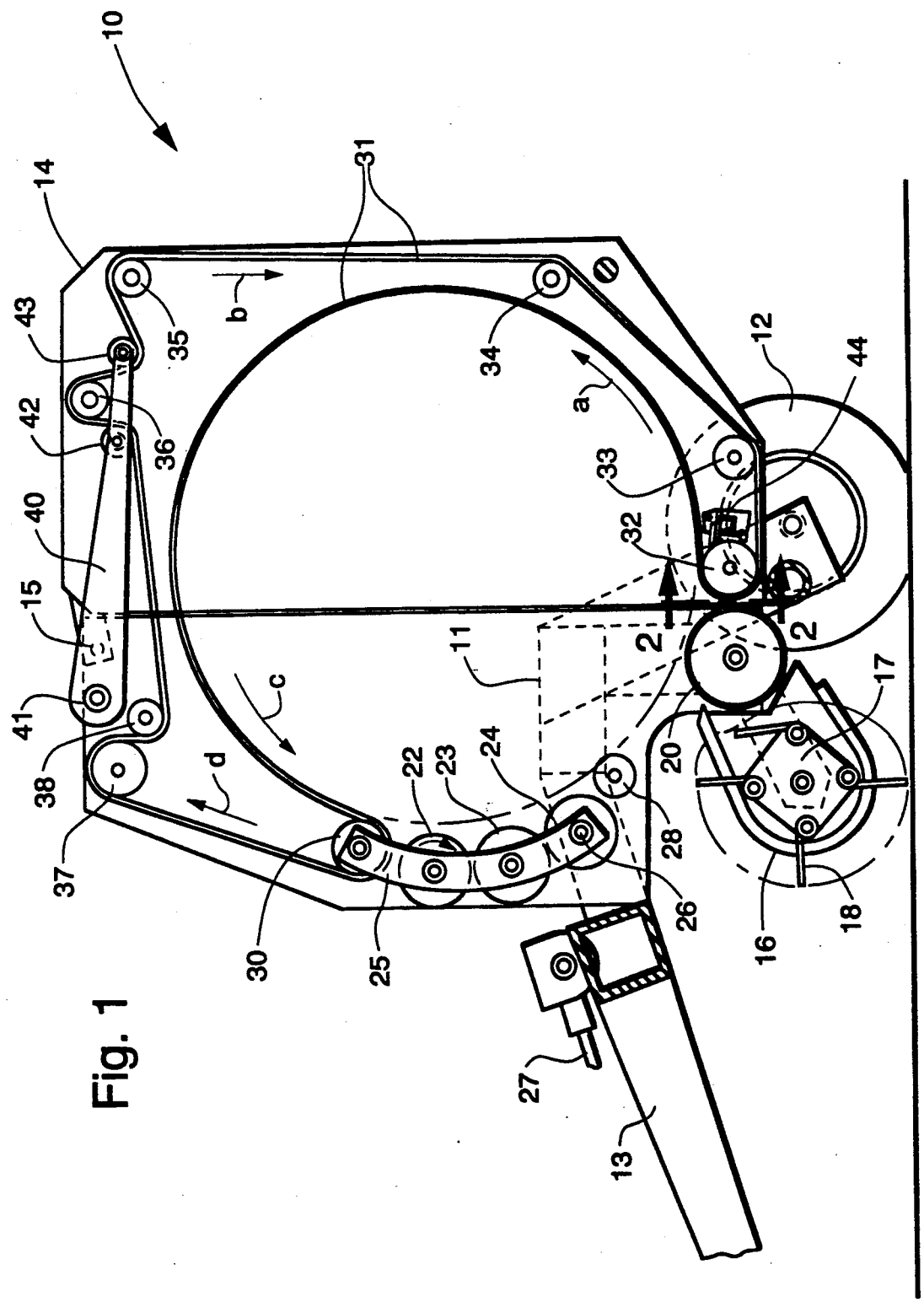
FIG. 1 is a diagrammatic side elevational view of a round baler in which the present invention is embodied.

Referring now to the drawings for a more detailed description of the preferred embodiment of the invention, FIG. 1 shows an expandable chamber round baler 10 of the type disclosed in detail in U.S. Pat. No. 4,870,812 issued on Oct. 3, 1989 in the name of R. E. Jennings et al. It includes a main frame 11 supported by a pair of wheels 12 (only one shown). A tongue 13 is provided on the forward portion of main frame 11 for connection to a tractor (not shown). A tailgate 14 is pivotally connected to main frame 11 by stub shaft 15 and a similar opposing stub shaft (not shown) so that tailgate 14 may be pivoted from the closed position shown in FIG. 1 to an opened position shown and described in the Jennings et al patent mentioned above. A conventional pickup 16 is mounted on main frame 11 by a pair of brackets 17 (only one shown) and is supported in a well known manner by a pair of wheels (not shown). The pickup 16 includes a plurality of fingers or tines 18 moveable in a predetermined path (shown in phantom outline) to lift crop material from the ground and deliver it rearwardly toward a floor roll 20 which is rotatably mounted on main frame 11.

In accordance with the baler in which the present invention is embodied, a sledge assembly 21 includes a plurality of rollers 22, 23, 24 extending transversely of main frame 11 in an arcuate arrangement and journalled at the ends thereof in a pair of arcuately shaped opposing arms 25, only one of which is shown. Arms 25 are pivotally mounted inside main frame 11 on a pair of stub shafts 26 (only one shown) for permitting movement of sledge assembly 21 between a bale starting position, shown and described in Jennings et al, and a full bale position shown in FIG. 1. Rollers 22, 23, 24 are driven in a clockwise direction as indicated in FIG. 1, by conventional means (for example, chains and sprockets or gears) connected with a drive shaft 27 which is adapted for connection to the PTO of a tractor. A starter roll 28 is located adjacent roller 24 and is also driven in a clockwise direction, as viewed in FIG. 1, to enhance core starting and strip crop material from roller 24. An idler roller 30 is carried by arms 25 for movement in an arcuate path when sledge assembly 21 moves between the bale starting position (not shown) and the full bale position (shown in FIG. 1). Idler roller 30 is freely rotatable.

An apron comprises a plurality of side by side belts 31 supported on guide rolls 32, 33, 34, 35, 36 which are rotatably mounted in tailgate 14 and on a drive roll 37 which is rotatably mounted in main frame 11. Although the belts 31 pass between sledge roller 22 and idler roller 30, they are in engagement with only idler roller 30, while roller 22, due to being located in close proximity to belts 31, strips crop material from belts 31. Further conventional means (not shown) are connected with drive shaft 27 to provide rotation of drive roll 34 in a direction which causes movement of belts 31 in the direction indicated by arrows a, b, c and d along the path shown in FIG. 1, the inner course of which is designated by arrows a & c. An additional guide roll 38 in main frame 11 ensures proper driving engagement between belts 31 and rive roll 37. Another pair of arms 40 (one shown) are pivotally mounted on main frame 11 by a cross shaft 41 for movement during bale formation between inner and outer positions, the outer full bale position being shown in FIG. 1. Arms 40 carry additional guide rolls 42 and 43 for guiding belts 31. Resilient means (not shown) are provided to normally urge arms 40 toward their inner positions while resisting movement thereof to their full bale outer positions. A complete description of bale formation in baler 10 is provided in the Jennings et al patent, referred to above.

For the purpose of the present invention, it should be understood that as round baler 10 is towed across a field by a tractor, pickup tines 18 lift crop material from the ground and feed it onto the bale forming chamber via a throat defined by roller 28 spaced from floor roller 20. The crop material is conveyed by floor roll 20 into engagement with a series of inwardly facing moving surfaces comprising the inner course of the apron and rollers 22, 23, 34 and 28, whereby it is coiled in a counterclock-wise direction (as viewed in FIG. 1) to form a bale. During such formation, continued feeding of crop material into the chamber by pickup tines 18 causes the apron belts 31 to expand until arms 40 rotate to their outer position shown in FIG. 1. When a full sized bale has been so formed, it is then wrapped with a suitable material, such as twine or net, tailgate 14 is opened by conventional means (for example, hydraulic cylinders) and the bale is ejected as shown in FIG. 3. Subsequent closing of tailgate 14 returns apron belts 31 to their initial position (not shown) and round baler 10 is again ready to form another bale.

Now turning to the stripping apparatus of the present invention, it will be understood in light of the prior art and the above description that during formation of a bale the hay is agitated and churned and in some instances especially in certain crop types and conditions, it has a tendency to pass through the spaces between the belts and/or the endwalls of the baler and the adjacent end belts and build-up or wrap on various rolls. To this end, an improved stripper assembly 44 is shown in FIG. 1 operative to prevent or significantly reduce build-up and wrapping on roll 32. A similar assembly could be used in conjunction with other rolls where problems of build-up and/or wrapping occur, such as, for example, idler roll 30 and guide roll 38.

Figure 6:
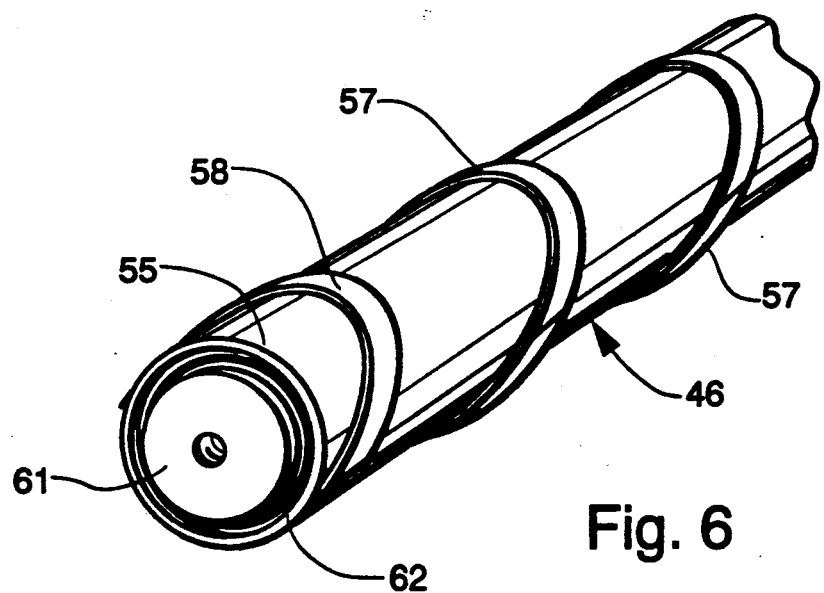
FIG. 6 is a perspective view of the roller shown in FIGS. 2 and 4.

Now turning to FIGS. 2 and 3, stripper assembly 44 comprises a scraper assembly 45 of conventional design, and a unique roll configuration, generally designated by reference numeral 46 (also shown in FIG. 6). More specifically, scraper assembly 45 includes a pair of mounting brackets 47, FIG. 3, affixed in opposing relationship to the side walls 48 (FIG. 2) of the baler by suitable securement means 50. Extending between and secured to brackets 47 is channel shaped support 51 to which mounting plate 52 is welded. A scraper 53 is secured to and extending from the traverse edge of plate 52 by a series of carriage bolts 54 extending through slots in plate 52 to provide for adjustment of the scraper relative to the roll with which it is associated.

The unique roll configuration referred to above comprises a cylindrical roll 55 mounted on shaft 56 journalled for rotation between side walls 48 (only one shown) of the baler via bearing assemblies mounted inside rolls 55. Secured to the outer surface of roll 55 are a plurality of rigid strips 57 following a generally elliptical path. The outer surfaces of strips 57 are parallel to the outer surface of roll 55 so that a cylindrical shape is generated by the outer surfaces of strips 57 under conditions when roll 55 is rotated. Referring to FIGS. 2 and 6, these strips are shown in a parallel array with the endmost strip 58 following a partial elliptical path. Each strip is made up of a pair of mating segments (having the same general shape as the end strip and interchangeable therewith) for ease of manufacture. FIG. 4 shows the stripper assembly 44 of FIG. 2 with roller 55 in the position it takes when rotated 180 degrees, relative to the position shown in FIG. 2.

Also shown in FIGS. 2 and 4 is side-by-side belts 31' and 31" with belt 31' spaced from endwall 48 a distance indicated by reference numeral 59, and belts 31' and 31" spaced from each other by a space 63. Belts 31' and 31", trained around the unique roll configuration are in contact with the outer flat surfaces of strips 57, 58, as clearly depicted in FIG. 3.

Figure 5:
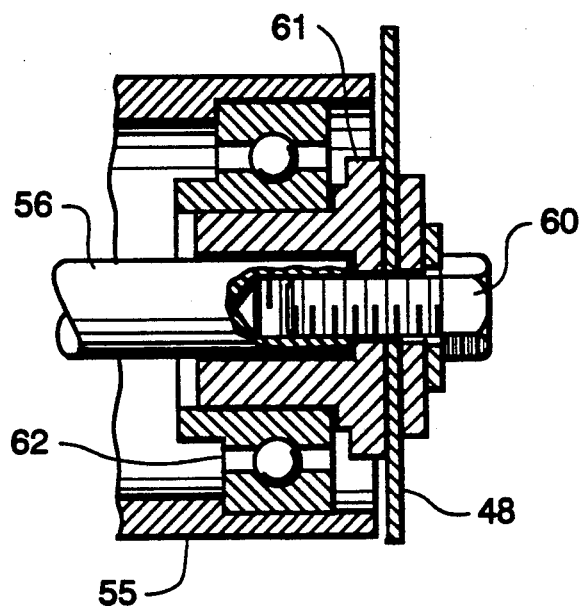
FIG. 5 is a view taken in the direction of arrows 5—5 in FIG. 3.

FIG. 5 shows in further detail the mounting arrangement for roll 55 shown in FIGS. 2-4. Shaft 56 is axially secured via threaded bolt 60 to side wall 48. Hat shaped section 61 is also secured to wall 48 and bearing assembly 62 is secured to section 61 and interposed between it and roll 55 to provide for rotation of roll 55 about shaft 56.

In operation, unwanted debris from the crop material being formed into a bale passes between adjacent belts, which are trained around various rolls such as roll 55 shown in FIG. 2 wherebetween space 63 exists. Unwanted crop material may also pass through the space 59 between the end belt and sidewall 48. This unwanted debris becomes entrapped between the belt and roll and as is commonly known from prior art experience will presumably either wrap around the roll or build-up on the roll causing commonly encountered problems in belt tracking and belt wear. An important aspect of the present invention is the engagement of the leading edge of rigid strips 58 with the unwanted debris. Due to the angular disposition of the strips the debris is contacted with a component of force in an axial direction thus preventing the debris from wrapping or building up on roll 46. An equally important aspect of this invention is the fact that the next succeeding strip member engages the debris with a leading edge that has an axial force component in the opposite direction (see FIG. 4) and thereby provides for reciprocal motion of the debris relative to the cooperating scraper. This reciprocal motion prevents build-up and enhances the action of the scraper relative to the roll.

Included in the many advantages, explicit and implicit, of the novel apparatus of the present invention and equally as important as the above discussed advantages is the capability to readily adapt the rolls of any transversely disposed round baler roller with the unique structure without requiring significant changes to the existing structure.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention. For example, although the preferred embodiment of the invention is incorporated in a round baler in which the chamber is defined by a series of belts and rolls, it is contemplated that any type of round baler, regardless of chamber defining means, whether an expandable or non-expandable chamber, could be encompassed by the principles of this invention.

Having thus described the invention, what is claimed is:

1. In a round baler having a frame, conveying means including rotatable transverse rolls mounted on said frame, said conveying means providing a series of inwardly facing moving surfaces that define a baling chamber for forming cylindrical bales of crop material, means for feeding crop material into said chamber, and scraper means mounted adjacent one of said rolls for preventing buildup of unwanted material on said roll, the improvement comprising:
   rigid strips affixed to and extending from the outer surface of said one roll along a path in the shape of a closed loop, said strips including a leading edge portion for engaging crop material randomly deposited on said roll and urging said crop material in a generally axial direction under conditions where said roll is rotated.

2. A round baler as set forth in claim 1 wherein said strips include a second leading edge portion for engaging crop material and urging it in the opposite axial direction.

3. A round baler as set forth in claim 2 wherein said strips are continuous along said path and encompass said roll, and
   said first and second leading edge are disposed on opposite sides of said strips.

4. A round baler as set forth in claim 1 wherein said strips have a flat outer surface the generates a cylindrical shape under conditions when said roll is rotated.

5. A round baler as set forth in claim 4 wherein said scraper means includes an edge closely spaced relative to said cylindrical shape.

6. A round baler as set forth in claim 5 wherein said strips include a second leading edge portion for engaging crop material and urging it in the opposite axial direction.

7. A round baler as set forth in claim 6 wherein said strips are continuous along said path and encompass said roll, and
   said first and second leading edge are disposed on opposite sides of said strips.

8. A round baler as set forth in claim 1 wherein a plurality of paths in the shape of a closed loop are provided, along each of which rigid strips are affixed to the outer surface of said one roll.

9. A round baler as set forth in claim 8 wherein said paths are parallel.

10. A round baler as set forth in claim 1 wherein said path is elliptically shaped.

* * * * *